US008645263B1

(12) United States Patent
Seel et al.

(10) Patent No.: US 8,645,263 B1
(45) Date of Patent: Feb. 4, 2014

(54) SYSTEM AND METHOD FOR RISK PRIORITIZATION

(75) Inventors: Graham Stephen Seel, Clayton, CA (US); Jacob Firestone, Martinez, CA (US); Craig Allan Chinn, Walnut Creek, CA (US); Christina A. Clark, Lincoln City, OR (US); Frank S. Danek, Danville, CA (US); Dee Witherow, Sausalito, CA (US); Christina M. Robbins, Waltham, MA (US)

(73) Assignee: Bank of America Corporation, Charlotte, NC (US)

( * ) Notice: Subject to any disclaimer, the term of this patent is extended or adjusted under 35 U.S.C. 154(b) by 1028 days.

(21) Appl. No.: 11/760,276

(22) Filed: Jun. 8, 2007

(51) Int. Cl.
*G06Q 40/00* (2012.01)
(52) U.S. Cl.
USPC .............................. 705/38; 705/35
(58) Field of Classification Search
CPC ............................. G06Q 40/025; G06Q 40/00
USPC ........................................ 705/38, 35, 7, 10
See application file for complete search history.

(56) References Cited

U.S. PATENT DOCUMENTS

| 6,397,202 | B1 * | 5/2002 | Higgins et al. ................. 706/47 |
| 7,072,794 | B2 * | 7/2006 | Wittkowski .................. 702/179 |
| 7,313,541 | B2 * | 12/2007 | Wise et al. ................. 705/36 R |
| 7,801,808 | B1 * | 9/2010 | Mattison et al. ................. 705/38 |
| 2002/0059093 | A1 * | 5/2002 | Barton et al. .................... 705/10 |
| 2002/0184058 | A1 * | 12/2002 | Simonson et al. ................. 705/4 |
| 2002/0198750 | A1 * | 12/2002 | Innes et al. ........................ 705/7 |
| 2003/0033093 | A1 * | 2/2003 | Nelson ........................... 702/34 |
| 2003/0037063 | A1 * | 2/2003 | Schwartz .................... 707/104.1 |
| 2003/0171897 | A1 * | 9/2003 | Bieda et al. .................... 702/185 |
| 2004/0015375 | A1 * | 1/2004 | Cogliandro ....................... 705/7 |
| 2004/0260703 | A1 * | 12/2004 | Elkins et al. .................... 707/100 |
| 2005/0060213 | A1 * | 3/2005 | Lavu et al. ......................... 705/7 |
| 2005/0066239 | A1 * | 3/2005 | Keeton et al. .................... 714/47 |
| 2005/0240511 | A1 * | 10/2005 | Chadwick et al. ............. 705/37 |
| 2006/0190339 | A1 * | 8/2006 | Wan et al. ....................... 705/22 |
| 2006/0259336 | A1 * | 11/2006 | Anas et al. ........................ 705/7 |
| 2007/0043656 | A1 * | 2/2007 | Lancaster ....................... 705/38 |
| 2007/0233508 | A1 * | 10/2007 | Gillespie .......................... 705/1 |

* cited by examiner

*Primary Examiner* — Eric T Wong
*Assistant Examiner* — Edward Baird
(74) *Attorney, Agent, or Firm* — Banner & Witcoff, Ltd.; Michael A. Springs (57) ABSTRACT

Methods and systems for risk prioritization allow a user or organization to prioritize various risk items using a knowledge base. The knowledge base may be continually updated and/or improved based on newly available historical data (e.g., cost of mitigation, actual effects), new forecasts or predicative analyses (e.g., costs for mitigation), expert community consensus and/or new priority information. As new information is updated in the knowledge base, new and existing risk items may be evaluated and/or re-evaluated to determine a risk priority. Risk priority may be determined based on a remediation cost score as well as a risk score. The prioritization system may further develop recommendations for prioritizing and mitigating a risk item.

25 Claims, 9 Drawing Sheets

SYSTEM AND METHOD FOR RISK PRIORITIZATION

BACKGROUND

Risks are a pitfall of everyday life. In many instances, solutions are identified and implemented to mitigate any damage that may be caused by a risk. However, these solutions often have associated costs and thus, for many organizations and companies, there are often too many risks to address each one while maintaining profitability. Thus, risks often need to be prioritized to insure that critical risks are addressed while profitability is preserved. In current systems, risks are often evaluated and prioritized using purely manual and subjective analyses. Thus, risk analysis personnel must individually evaluate each risk as they are uncovered. This results in a significant expenditure of time in addition to a highly subjective prioritization based on forecasts and guesstimation.

SUMMARY

This summary is provided to introduce a selection of concepts in a simplified form that are further described below in the Detailed Description. The Summary is not intended to identify key features or essential features of the claimed subject matter, nor is it intended to be used to limit the scope of the claimed subject matter.

A risk prioritization system and method allows an organization or individual to process risks in an automated and objective manner. A knowledge base may be used to store data associated with risk types (also called risk categories). As new information is made available, the knowledge base may be updated to allow more precise, updated and/or accurate analyses. The knowledge base and/or risk portfolio may store information such as costs associated with various types of mitigation, potential effects of a risk item and/or potential causes of a risk item. Further, risk prioritization may include updating the risk portfolio with one or more new risk items, analyzing the new risk items, evaluating potential exposures, determine costs associated with remediation and/or mitigation and ranking the risk items. This process may be repeated on a periodic or aperiodic basis. For example, risk items may be re-evaluated and re-prioritized each time new information is saved to the knowledge base and/or the risk portfolio. In another example, priority ranking of risk items may be reevaluated when a risk item is deleted from or added to the risk portfolio. Risk priority may be determined based on a risk score (derived from likelihood and exposure scores), a cost score, and a solution effectiveness measure. A raw risk score may also be adjusted using a modifier. The modifier allows organization personnel to adjust a risk score to reflect external and internal drivers such as regulatory requirements.

BRIEF DESCRIPTION OF THE DRAWINGS

The foregoing summary of the invention, as well as the following detailed description of illustrative embodiments, is better understood when read in conjunction with the accompanying drawings, which are included by way of example, and not by way of limitation with regard to the claimed invention.

DETAILED DESCRIPTION

In the following description of various illustrative embodiments, reference is made to the accompanying drawings, which form a part hereof, and in which is shown, by way of illustration, various embodiments in which the invention may be practiced. It is to be understood that other embodiments may be utilized and structural and functional modifications may be made without departing from the scope of the present invention.

Figure 1:
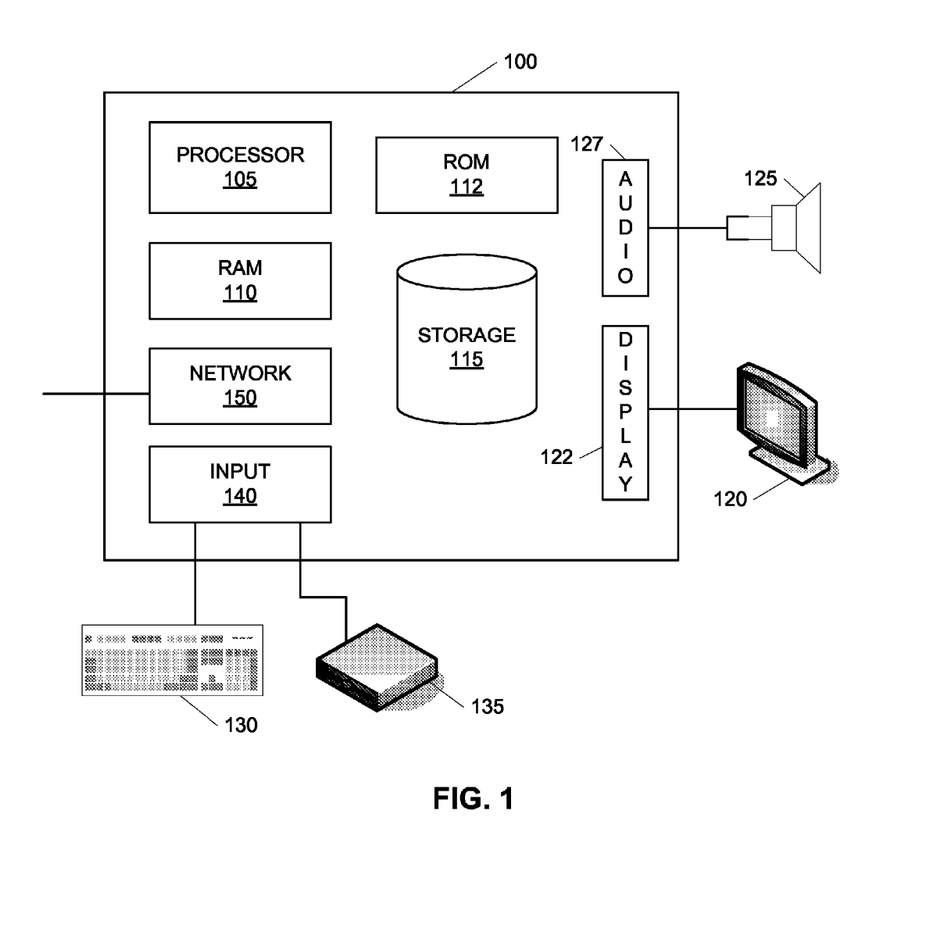
FIG. 1 illustrates a computing environment in which one or more aspects described herein may be implemented.

FIG. 1 illustrates a computing environment in which one or more aspects described herein may be implemented. A computing device such as computer 100 may house a variety of components for inputting, outputting, storing and processing data. For example, processor 105 may perform a variety of tasks including executing one or more applications, retrieving data from a storage device such as storage 115 and/or outputting data to a device such as display 120. Processor 105 may be connected to Random Access Memory (RAM) module 110 in which application data and/or instructions may be temporarily stored. RAM module 110 may be stored and accessed in any order, providing equal accessibility to the storage locations in RAM module 110. Computer 100 may further include Read Only Memory (ROM) 112 which allows data stored thereon to persist or survive after computer 100 has been turned off. ROM 112 may be used for a variety of purposes including for storage of computer 100's Basic Input/Output System (BIOS). ROM 112 may further store date and time information so that the information persists even through shut downs and reboots. In addition, storage 115 may provide long term storage for a variety of data including applications and data files. Storage 115 may include any of a variety of computer readable mediums such as disc drives, optical storage mediums, magnetic tape storage systems, flash memory and the like. In one example, processor 105 may retrieve an application from storage 115 and temporarily store the instructions associated with the application RAM module 110 while the application is executing.

Computer 100 may output data through a variety of components and devices. As mentioned above, one such output device may be display 120. Another output device may include an audio output device such as speaker 125. Each output device 120 and 125 may be associated with an output adapter such as display adapter 122 and audio adapter 127, which translates processor instructions into corresponding audio and video signals. In addition to output systems, computer 100 may receive and/or accept input from a variety of input devices such as keyboard 130, storage media drive 135 and/or microphone (not shown). As with output devices 120 and 125, each of the input devices 130 and 135 may be associated with an adapter 140 for converting the input into computer readable/recognizable data. In one example, voice input received through microphone (not shown) may be converted into a digital format and stored in a data file. In one or more instances, a device such as media drive 135 may act as both an input and output device allowing users to both write and read data to and from the storage media (e.g., DVD-R, CD-RW, and the like).

Computer 100 may further include one or more communication components for receiving and transmitting data over a network. Various types of networks include cellular networks, digital broadcast networks, Internet Protocol (IP) networks and the like. Computer 100 may include adapters suited to communicate through one or more of these networks. In particular, computer 100 may include network adapter 150 for communication with one or more other computer or computing devices over an IP network. In one example, adapter 150 may facilitate transmission of data such as electronic mail messages and/or financial data over a company or organization's network. In another example, adapter 150 may facilitate transmission or receipt of information from a world wide network such as the Internet. Adapter 150 may include one or more sets of instructions relating to one or more networking protocols. For example adapter 150 may include a first set of instructions for processing IP network packets as well as a second set of instructions associated with processing cellular network packets. In one or more arrangements, network adapter 150 may provide wireless network access for computer 100.

One of skill in the art will appreciate that computing devices such as computer 100 may include a variety of other components and is not limited to the devices and systems described in FIG. 1.

Figure 2:
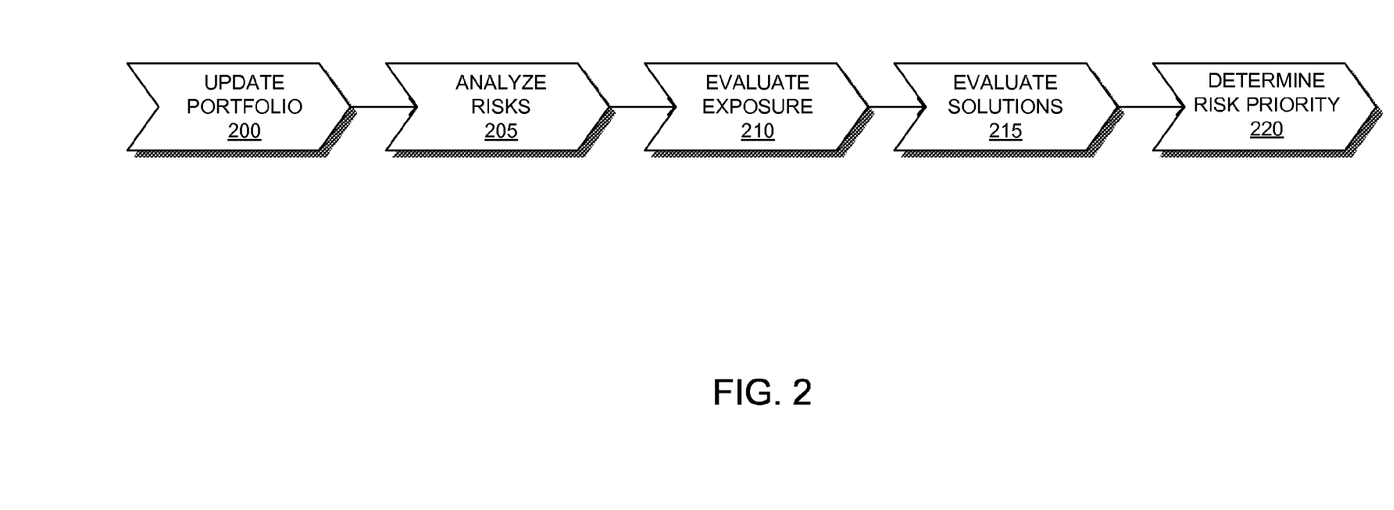
FIG. 2 is a flowchart illustrating a method for prioritizing risk items according to one or more aspects described herein.

FIG. 2 is a flowchart illustrating a method for prioritizing technology risks and making technology risk decisions. In step 200, a portfolio may be updated with a new risk item. Risk items, as used herein, generally refer to an occurrence of a risk type (for example in a particular application or system environment, or a in a specific product or organizational entity). Risk types relate generally to categories of risks that may be relevant in a given scenario and/or industry. A risk portfolio may be created or initiated based on manually created or identified risk items or risk items that are detected using automated systems. In one example, a risk item may be determined based on user responses to a product or service questionnaire. In another example, personnel may manually evaluate risks that may arise in various scenarios and for various applications or environments. In step 205, the new risk item may undergo risk analysis including identifying risk types associated with the new risk item, causes of the risk item and trends corresponding to the risk type. The new risk item may be categorized into a risk type in a variety of ways including comparing attributes of the risk item with other risk items in the portfolio. Alternatively or additionally, risk types may include parameters for risk item membership in that risk type. The causes and trends of the new risk item may also be evaluated based on, for example, the knowledge base. Thus, if a similar existing risk item was created by a particular cause, that cause may also be associated with the new risk item. Trends, on the other hand, relate generally to patterns of activity that have resulted for similar risk items or risk items of the same risk type. A pattern may be considered a trend if the pattern has resulted or occurred in a threshold number of cases.

In step 210, a risk prioritization system and/or method may evaluate the exposure associated with the new risk item. For example, the system may determine potential effects of the new risk item as well as analyze the historical impacts of the risk and/or the risk's effects. Additionally or alternatively, a cost associated with the potential effects and exposure of the new risk item may also be determined. Other processes that may be performed to evaluate exposure may include identifying potential lines of businesses (LOBs) that may be impacted and initially ranking the risk item based on the potential exposure. Exposure may be evaluated in a variety of ways including through the use of business rules developed from historical data and/or expert community consensus. Expert community consensus generally relates to an agreement between one or more individuals having knowledge and experience in the field to which the risk applies. Thus, in one or more configurations, expert community consensus information may be collected and stored in a knowledge base. From the expert community consensus, business rules may be derived for guiding the various processes described herein. In step 215, possible avenues of remediation and/or mitigation may be determined and evaluated for potential for success, mitigation percentage, cost of implementation and the like. In one or more arrangements, remediation and/or mitigation sizing may also involve identifying personnel, teams, equipment and systems that may be required in instituting a course of action to remediate or mitigate the risk. The evaluation and analysis may be conducted based on historical data and other data already stored in the knowledge database. As discussed, the data may include projections, information collected from past risk items, valuations of cost and the like.

In step 220, the risk prioritization system may determine a risk priority associated with the new risk item based on the evaluations and analyses performed in the above steps. The risk priority may indicate a ranking of risk items representing the urgency with which the risk items need to be addressed. For example, the system may consider and evaluate the potential damage associated with an adverse outcome of the risk item, the cost of remediation or mitigation as well as the potential for success in remediating or mitigating the risk item to determine a risk priority. Based on the risk prioritization, a company or organization may determine whether the benefits outweigh the costs to address a risk item and if so, an order in which to address the items. Further details regarding each of the steps of FIG. 2 are provided below.

Figure 3:
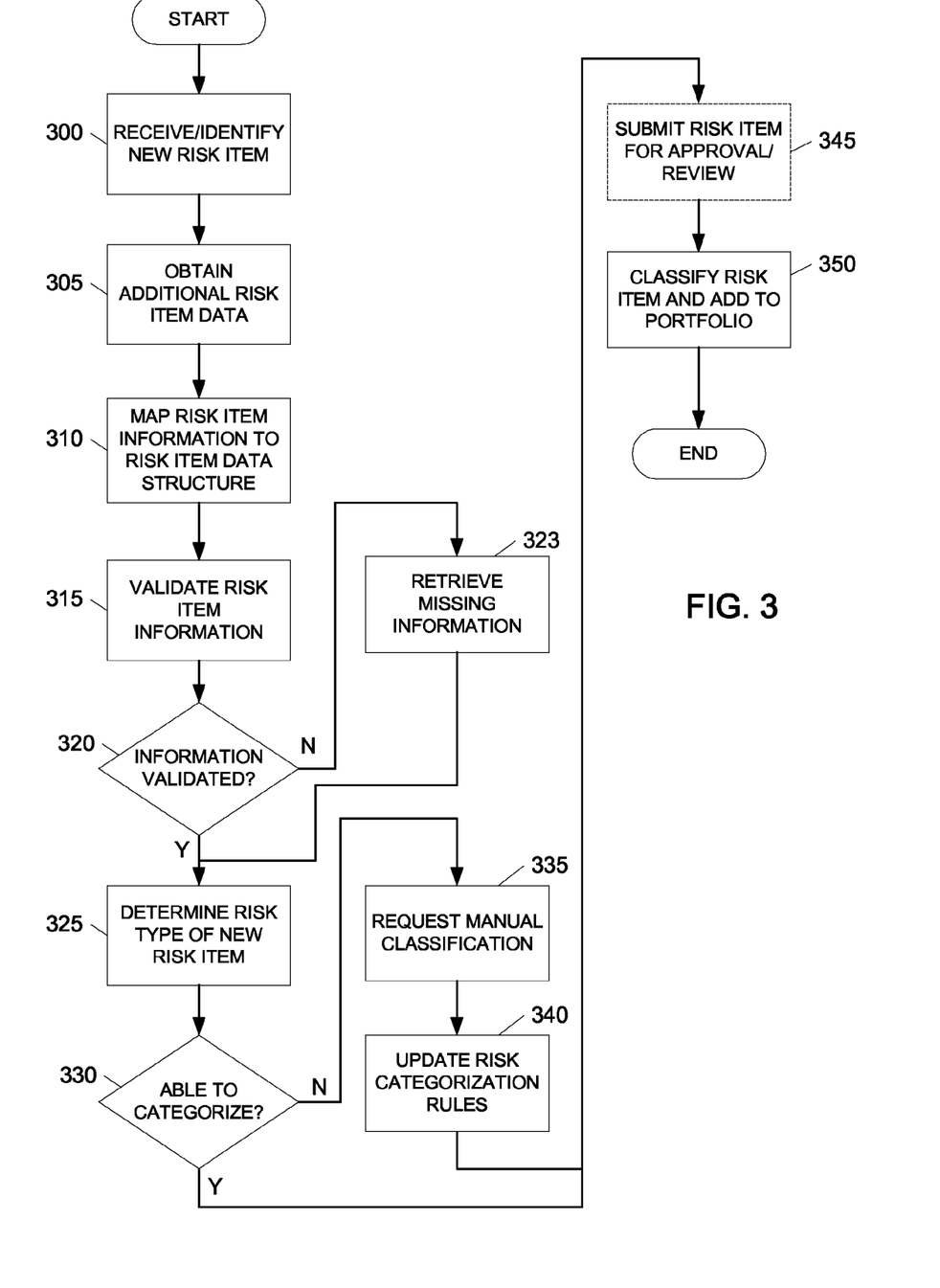
FIG. 3 is a flowchart illustrating a method for processing new risk items and updating a risk portfolio according to one or more aspects described herein.

FIG. 3 is a flowchart illustrating a method for updating a portfolio. In step 300, a new risk item may be identified and/or received by a risk prioritization system. The risk item may include structured input, manual input or a combination of both. Structured input generally refers to new risk item data that is prepackaged according to a predefined format. For example data from automated or manual assessment of a number of systems, processes or departments may be packaged in a structured manner and input to this step. Alternatively, manual input relates to on-the-fly entry of risk item information. In step 305, additional risk item data may be collected. For example, if necessary risk item data is missing, the system may prompt a user to fill in the missing information. Alternatively or additionally, the system may automatically seek out the missing data from one or more sources such as the Internet. In step 310, the risk item data input into the system may be mapped to a risk item data structure used by the system. The risk item data structure may allow the system to store each risk item in a uniform manner. In one example, a risk item data structure may include a risk name field, an associated application field and/or a risk type field. Various other fields may be defined for a risk item data structure according to the preferences of a company or organization.

In step 315, the risk item data may be validated for completeness and acceptability. One or more fields or types of information may be required by the system and thus, the system may determine whether those fields of information have been entered. In one or more instances, certain information associated with a risk item may require a certain format. As such, if the information is not entered in the required format, the system may determine that the information is invalid. If the risk item data is not validated, as determined in step 315 and 320, the system may retrieve the missing and/or invalid data either automatically or by requesting manual input from personnel or both in step 323.

In step 325, the prioritization system may identify a risk category or type to which the risk item belongs. The risk item may be categorized based on the information submitted using categorization rules from a knowledge database. Risk categorization may be based upon a formal classification scheme (e.g., a taxonomy). An automated prioritization system would allow the use of a detailed, multi-level taxonomy to classify a risk item. Taxonomies and classifications may be defined based on a variety of risk characteristics such as an application with which the risk is associated, source of the risk, potential effects and the like. Categories of risks may be defined by a company or organization based on their needs and preferences, or derived from industry standard classification schemes. Identification of risk type may be determined by automated mapping rules and/or manual input. If, in step 330, the system determines that a risk item cannot be properly categorized, the system may request manual classification of the item in step 335. That is, the system may transmit the risk item to company personnel for manual review and classification. In step 340, the system may update the risk item categorization rules based on the classification made by the support personnel in step 335.

Once an appropriate risk type has been identified for the risk item, in one or more arrangements, the risk item may be submitted for review and/or approval in step 345. Review and/or approval may be automated or manual (e.g., review by a first line of defense personnel responsible for insuring the integrity of items in the risk prioritization system). This step may be optional and/or only performed if various conditions are met. In one example, all manually created items may be submitted for review and/or approval. If the item is not approved, the item may be modified to correct whatever defects caused the disapproval. In step 350, the new risk item may be classified and added to the risk portfolio.

Figure 4:
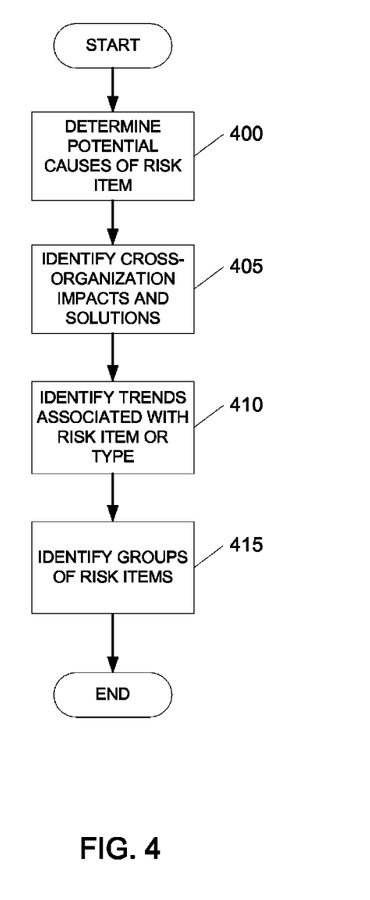
FIG. 4 is a flowchart illustrating a method for analyzing risk items according to one or more aspects described herein.

FIG. 4 is a flowchart illustrating a method for analyzing causes, trends and implications of a risk item. This risk analysis process may be performed once a new risk item has been added to the risk portfolio or if the knowledge database has been updated with new information. In step 400, the system may determine potential causes of the risk item. For example, if the risk item relates to the information theft in a customer database, the system may determine that a potential cause would be the level of security used to protect the database. Causes may be determined based on manual input from personnel and/or automatic determination using information gathered in the knowledge database. In step 405, the system may identify cross-organization impacts and solutions. That is, the system may determine how other organizations that may conduct business regularly with the organization may be impacted. In addition, the system may identify potential solutions already identified to prevent risk items from impacting those other organizations. The cross-organization impacts and solutions may be stored in the knowledge base in association with the relevant risk type.

In step 410, the system may identify trends that may apply to the risk item being analyzed. In particular, the system may determine whether trends exist in the frequency and severity of identification and occurrence associated with similar risk items (e.g., risk items of the same type). Identified trends may be stored in association with the risk item in the risk portfolio. In step 415, the system may identify potential groups of risk items having common characteristics and attributes. This may allow the system to identify groups of risk items that may be addressed by a single remediation solution. The identified groupings may be stored in the risk portfolio. In one example, the members of an identified grouping may include a group identification attribute to identify the risk item's membership in the group. The above method steps of FIG. 4 may be performed in various orders and are not limited to the sequence in which they are shown.

Figure 5:
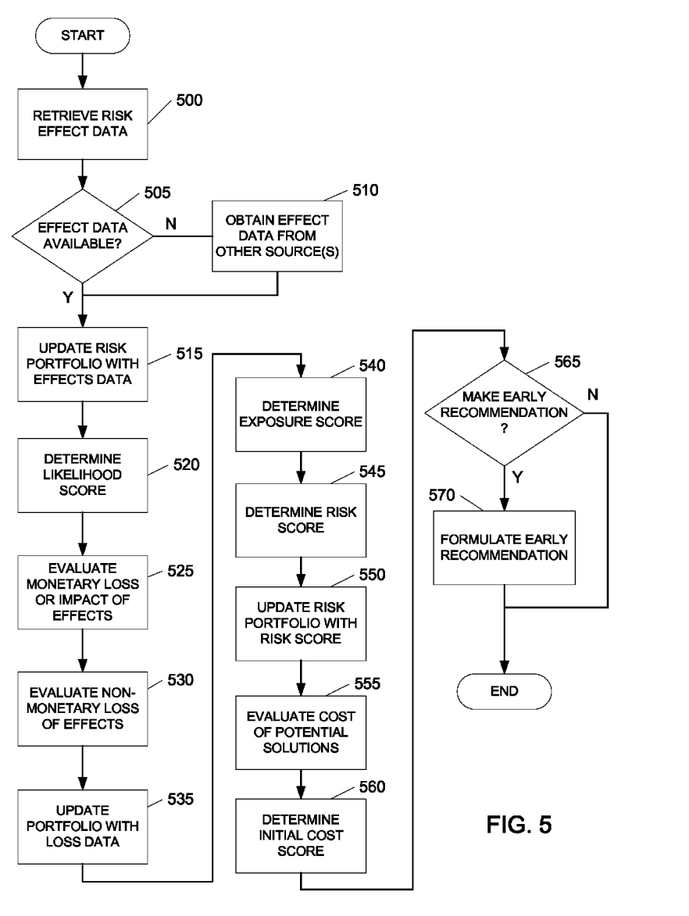
FIG. 5 is a flowchart illustrating a method for evaluating and analyzing potential exposure according to one or more aspects described herein.

Once a risk item has been added to the database and the item has been analyzed with respect to causes, trends and implications, a prioritization system may further evaluate the potential exposure associated with the risk item. FIG. 5 is a flowchart illustrating a method for evaluating exposure associated with a risk item. In step 500, the system may attempt to retrieve risk effect information from the risk knowledge database. The risk effect information may be derived based on historical data, expert community consensus and/or predictive analyses. In step 505, the system may determine whether risk effects data is available. If not, the system may request manual input or may automatically search other information sources (e.g., on-line search tools) in step 510. Risk effects data retrieved in step 510 may be used to update the risk portfolio in step 515. For example, the risk effects data may be associated, in the risk portfolio, with the risk item being evaluated. Alternatively or additionally, the risk effects data may be associated with a risk type of the risk item.

In step 520, the system may calculate a likelihood score indicative of a likelihood that identified risk effects will occur and produce various impacts. The likelihood score may be determined based on historical information, forecasts and/or expert community ratings. The likelihood score may be based on a log or linear scale of 1-10 or other scales. The following represents an example of a formula that may be used to determine a likelihood score (L represents the likelihood score):

$$L=(0.6*historical\_frequency\_index)+(0.4*forecast\_frequency\_index)$$

Once risk effects have been identified, and likelihood scores calculated, the system may then evaluate the operational loss or impact that has historically occurred for such effects. In step 525, for example, the system may identify monetary losses that have historically been associated with one or more risk effects. The system may obtain such information from the knowledge database. For example, the effects of identity theft or customer data theft may be associated with the costs of fraudulent charges and of repairing each customer's reputation. In step 530, the non-monetary losses or costs historically associated with the effects may also be identified. Non-monetary losses may include reputational loss, loss of investor confidence and/or customer dissatisfaction. In step 535, the system may update the risk portfolio with the loss data. For example, the system may associate the applicable loss data with the risk item being evaluated.

In step 540, the system may calculate an exposure score that indicates a level of exposure associated with a risk item. The exposure score may be determined based on predefined rules that takes into account a variety of factors including operational loss history, expert community consensus data on projected losses, historical and projected trends, and characteristics of the application, platform, product, department or other entity distinguishing the risk item. For example, an exposure score may be determined based on the following formula (E represents the exposure score):

$$E=0.5*\ln((\text{max\_regulator\_fine}+\text{max\_legal\_costs}+((\text{max\_historical\_costs}*0.75)+(\text{max\_potential\_costs}*0.25)))+\text{reputational\_risk\_index})*\text{unit\_regulatory\_index}/10)$$

In one or more arrangements, the score may be defined based on a scale of 1-10, where a score of 10 indicates a high level of exposure. Various other numeric and non-numeric scales may be defined and used.

In step 545, the system may determine a risk score based on the determined exposure and likelihood scores. For example the risk score may be determined according to the following formula, where R represents the risk score, E represents the exposure score and L represents the likelihood score:

$$R = \sum_{i=1}^{n} \sum_{j=1}^{m} (E_i * L_j)$$

Once determined, the risk score may be associated with the risk item and the risk portfolio may be updated in step 550. Further, in step 555, the system may perform an initial evaluation of the costs associated with implementing potential solutions. The costs may be determined from historical or forecast data stored in the risk knowledge base. Once the potential costs have been determined, a cost score may be calculated or otherwise determined in step 560. A cost rule may be used to calculate the cost score, taking into account historical cost factors and characteristics of the application, platform, process or organizational entity to which the solution would be applied. Previous consistent experience of effectiveness of a cost rule may allow the system to then use the determined cost score and the risk score to determine whether to make an early recommendation in step 565. The system may make such a determination by comparing the cost and risk scores (or a ratio thereof) with threshold scores or ratios. For example if the calculated risk rank exceeds an "always remediate" threshold, or if the calculated risk rank is less than an "always accept risk" threshold, an early or immediate recommendation may be made in step 570. Otherwise, the system might not make an early risk recommendation.

Figure 6:
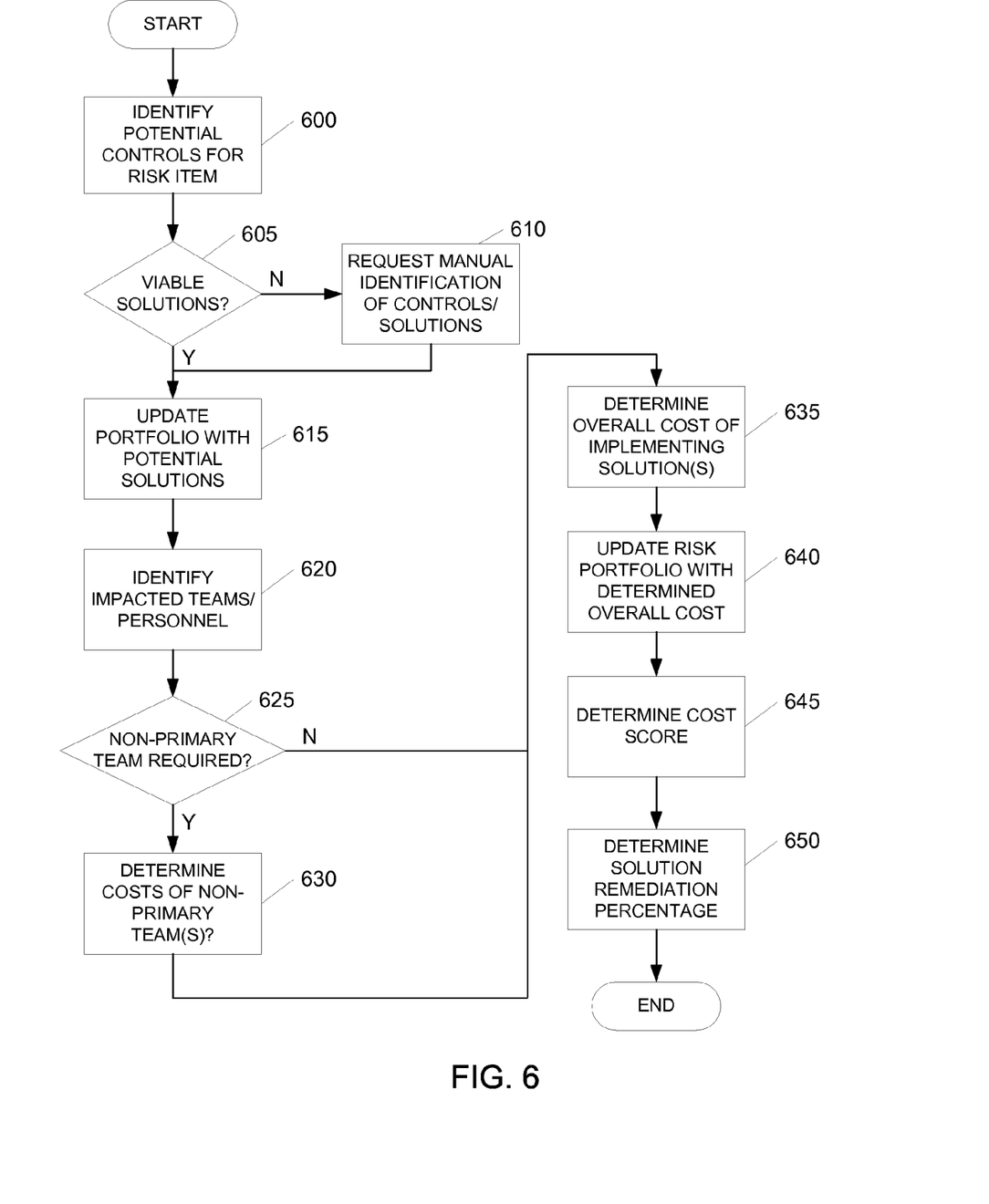
FIG. 6 is a flowchart illustrating a method for identifying potential solutions and determining costs associated with the solutions according to one or more aspects described herein.

According to one or more aspects, a risk prioritization system may identify and evaluate potential solutions to a risk item. FIG. 6 is a flowchart illustrating a method for identifying and analyzing possible risk solutions and determining a cost associated with one or more solutions. In step 600, the system may identify potential controls for the risk item. Controls, as used herein, generally relates to potential solutions that may be implemented to decrease the likelihood of occurrence or severity of impact of a risk item. The controls may be identified and retrieved from the risk knowledge database. In one or more arrangements, other information sources (e.g., Internet information sources) may also be consulted. In step 605, the system may determine whether the identified controls represent acceptable or viable solutions for the risk item. The determination may be made based on a variety of factors. For example, predefined rules may be generated based on criteria in the knowledge base which are derived from expert community experience. If the identified controls are determined to be unacceptable, or if insufficient information is present in the database to make such a determination, the system may request manual review of the risk item to identify other potential solutions in step 610. For example, the system may request that support personnel evaluate the risk and identify other solutions that would be viable and acceptable to the organization. Once identified, the system may update the knowledge base and/or the risk portfolio with the potential solutions in step 615.

Upon identifying viable solutions, the prioritization system may identify impacted teams or personnel in step 620. That is, the system may identify those that may be involved or needed in implementing one or more of the identified solutions. This identification process may include manual specification, automatic identification based on known expertise or a combination of the two. In one or more configurations, the system may also calculate initial cost scores associated with the identified impacted teams or personnel based upon prior experiences of solution implementations, expert community experience, and/or characteristics of the solution environment. The rule may also have an associated level of confidence to assist in manual finalization of a cost score. In step 625, the system may determine whether other teams or personnel beyond a primary team are required for applying the solution. For example, if a solution requires technology infrastructure enhancements, an IT infrastructure team may be required. A primary team generally refers to a team of one or more staff that manages the risk item. If so, cost information incurred by the other team (e.g., time, equipment) may be evaluated in step 630. In step 635, the overall costs associated with the solution may be determined based on the time and equipment that may be necessary in implementing the solution. If other teams are required, this overall cost may include the costs of the other teams' time and equipment. In step 640, the overall cost may be updated in the risk portfolio. Further, in step 645, a cost score may be determined based on the solution information and the determined cost data. The cost score may be determined in accordance with the methods described in step 560 of FIG. 5. In step 650, the prioritization system may further determine a solution remediation percentage. A solution remediation percentage generally relates to the amount of risk that is remediated after implementing the proposed solution(s). For example, if, even after a solution is implemented, 10% risk will still remain, the solution remediation percentage may be 90%. A solution remediation percentage may be determined based on information available in the knowledge base. For example, predictive analyses, expert community consensus and/or historical data may be used in deriving the solution remediation percentage.

Figure 7:
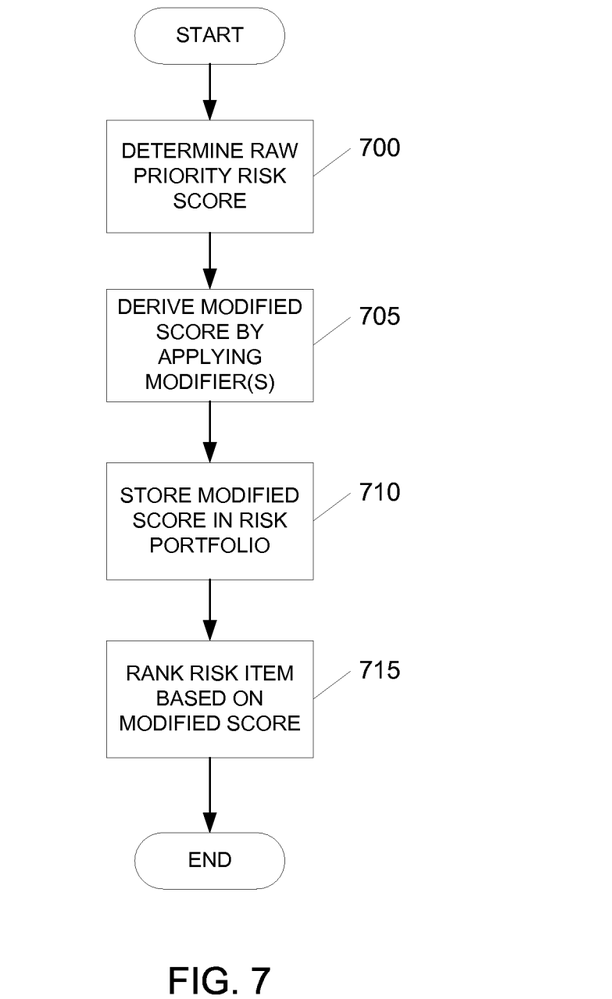
FIG. 7 is a flowchart illustrating a method for determining a risk priority based on a risk score according to one or more aspects described herein.

FIG. 7 is a flowchart illustrating a method for prioritizing risks based on a risk score. In step 700, the prioritization system may determine a raw priority score based on a risk score (e.g., risk score determined through methods of FIG. 5), a cost score (e.g., cost score determined through methods of FIG. 6) and remediation percentage. The raw risk priority score may represent a risk/reward ratio associated with the benefits of resolving a risk item and the costs associated with implementing potential solutions. In one or more arrangements, the raw risk priority score may be calculated according to the following formula, where P is the raw risk priority score, R represents the risk score and C represents the cost score:

$$P=(R/C)*(\text{solution\_remediation\_\%}/100)$$

In step 705, the system may then apply theme or category modifiers to the raw risk priority score to derive a modified risk priority score (P'). The theme or category modifier may be used to increase or decrease a risk priority score for a risk category based on preferences, needs, external factors that are not reflected in the calculations and determinations and the like. For example, a modified risk priority score may be calculated by adding a modifier value to (or subtracting from) the raw risk priority score. In step 710, the modified priority risk score may be stored in the risk portfolio in association with the risk item. An example of a need for a modifier would be external requirements laid down by external regulators regardless of evaluated risk priority.

In step 715, the system may rank the risk item based on the modified risk priority score. In particular, the system may compare the modified risk priority score for the risk item with the scores of other risk items in the portfolio. Various methods maybe used to determine a ranking based on the priority score. An organization may use the ranking to determine which risk items to address ahead of others.

Figure 8:
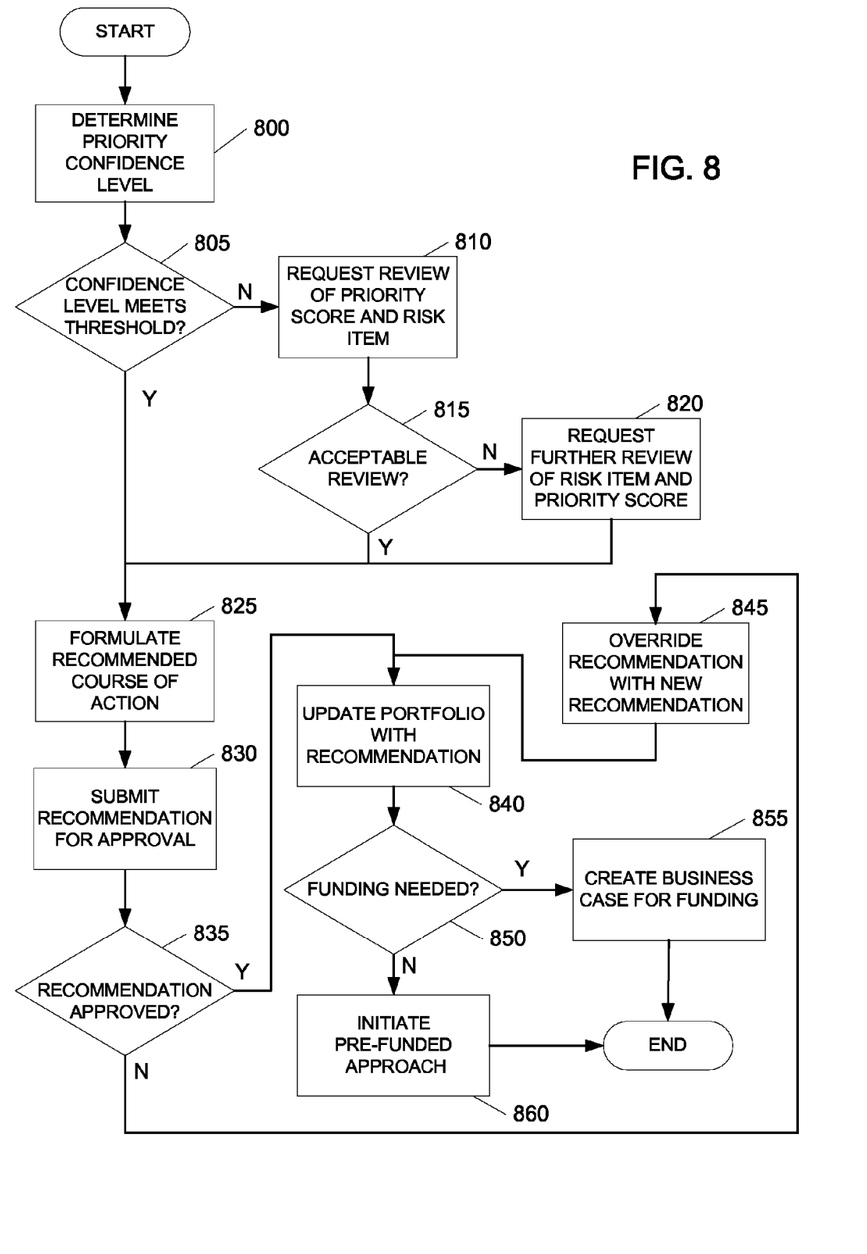
FIG. 8 is a flowchart illustrating a method for validating risk priority and formulating solution recommendations according to one or more aspects described herein.

FIG. 8 is a flowchart illustrating a method for validating risk priority and for creating recommendations based on the risk priority. In step 800, a priority confidence level may be determined based on information stored in the knowledge base, which may be driven by prior experience regarding the effectiveness of rules and data associated with the risk type of the risk item. The confidence level may reflect a comfort level associated with the determined priority. In step 805, the confidence level may be compared to a threshold confidence level to validate the priority. If the confidence level does not meet the threshold confidence level, the risk item and associated priority may be submitted for manual review in step 810. For example, the effects, impacts and associated risk score calculation, and the choice of remediation solution and associated cost score may be reviewed by company personnel to make sure the calculation was correct and that all factors were taken into account. In step 815, the system may determine whether the manual review resulted in the priority level being accepted (i.e., priority is valid) or rejected and overridden (i.e., priority is invalid and has been modified) by the reviewing personnel. If rejected and overridden, the system may request further research regarding the risk item and the determination of the priority level in step 820. The research may lead to updates and improvements in knowledge base rules and data to allow improved evaluation for future risk items of this type. If, however, the priority is valid and accepted or once a valid priority level has been determined, the system may formulate a recommended course of action with respect to the risk item in step 825. The recommendation may be based upon risk acceptance thresholds expressions of risk appetite) at the enterprise, line of business, or departmental level or determined by business rules.

Once a recommendation has been formulated, the recommendation may be sent for approval in step 830. The recommendation may be sent for approval to one or more risk decision-makers. A risk decision-maker may review the priority recommendations for all risk items in his/her domain and determine whether to accept or reject each one. Alternatively, portions of the approval process may be automated by comparing various parameters of the recommendation with predefined thresholds. In step 835, the system may determine whether the recommendation has been approved. If approved, the system may then update the risk portfolio with the recommendation information in step 840. If, however, the recommendation is not approved, a new or modified recommendation may override the previously formulated recommendation in step 845. Additionally, the risk portfolio may be updated to reflect the new or modified recommendation as described in step 840.

Once a recommendation is finalized and validated, the system may determine whether funding is needed to carry out the recommended course of action in step 850. If funding is required, critical input on costs and potential losses associated with non-remediation can be provided for formulation of a business case to obtain the necessary funds in step 855. If, however, no funding is needed, the system may initiate within a remediation tracking system a pre-funded or pool-funded remediation project (i.e., without requiring a funding process) as illustrated in step 860.

According to one or more aspects, as data is collected and obtained for various risk items, the risk portfolio and knowledge base may be updated and expanded. That is, a risk prioritization system may build upon the knowledge base to provide refined or more accurate evaluations of risk items. The new data may then be used to reevaluate risk items stored in the risk portfolio. Thus, in one example, if the system determines that a first risk item of a risk type requires an actual cost to mitigate, that cost data may be updated in the risk portfolio and knowledge base so that forecasts and cost scores associated with a second risk item of the same risk type may be more accurate. A risk prioritization system may reevaluate risk items in a portfolio at predefined intervals or in response to new information being added to one or more databases in the system.

Additionally, reports may be generated based on the data collected from the processing of various risk items and risk types. For example, a manager may be able to view detailed as well as summary data on all risks associated with a particular risk type or relevant to a specified department in an organization. Reports may include an analysis of risk severity, available solutions, recommendations made, decisions made and/or resulting residual risk(s). Reports may also be provided for auditors and regulators to provide risk profile data on an organization or technology entity.

Figure 9:
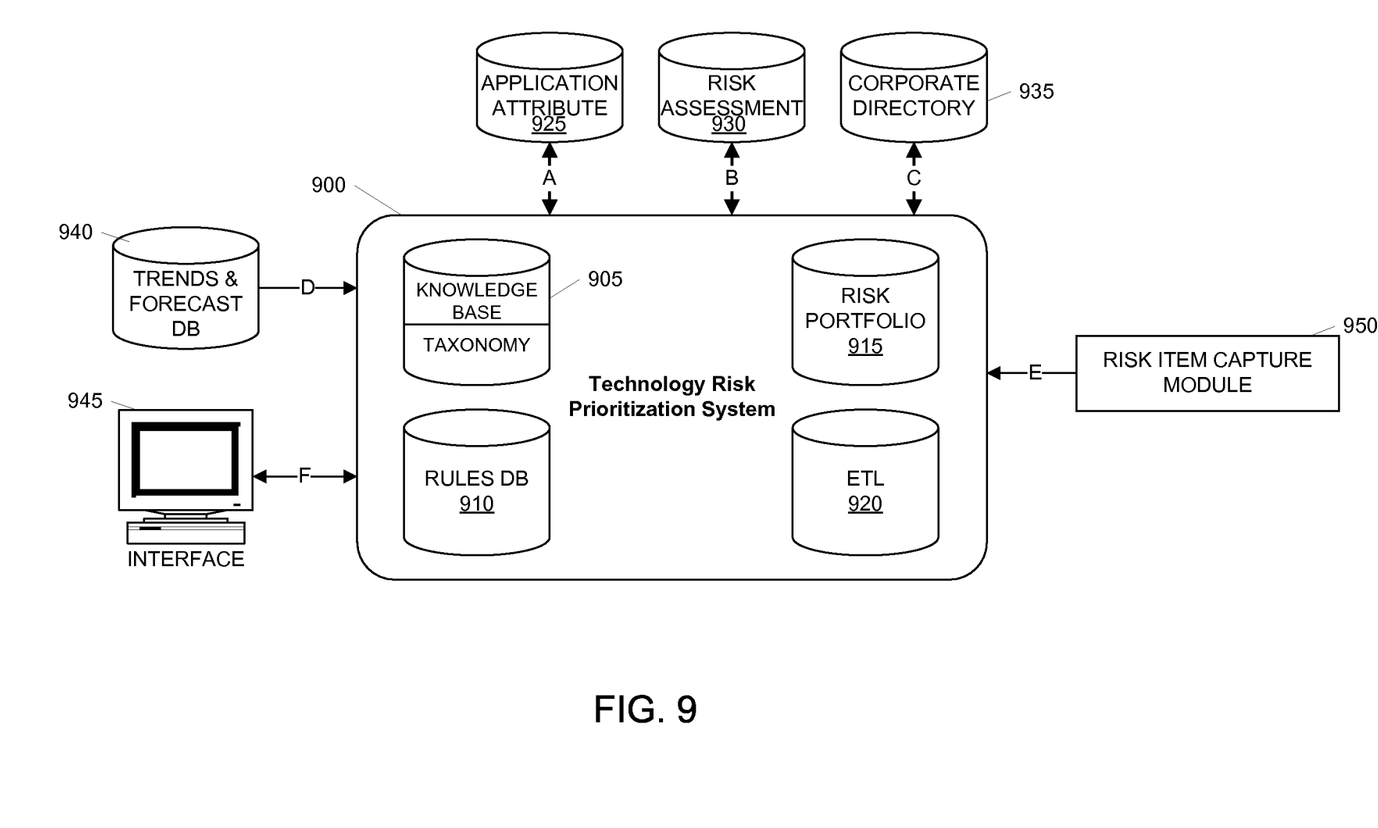
FIG. 9 illustrates a system for processing and prioritizing risk items according to one or more aspects described herein.

FIG. 9 illustrates a risk prioritization system 900 including knowledge base 905, rules database 910, risk portfolio 915 and Extract, Transform and Load (ETL) module 920. Knowledge base 905 may store data relating to risk types, their causes, their effects and/or their potential solutions. Additionally, knowledge base 905 may also store risk type or taxonomy information including categorization rules and parameters. Risk portfolio 915 may be configured to store risk items and various attributes of the risk items. For example, risk portfolio 915 may store a risk item along with the cost of remediation, potential solutions and/or causes, and recommendations and decisions. Rules database 910 may be used to store various types of rules including risk type or theme modification rules, score calculation rules, confidence determination rules and the like. Thus, in one example, determining a confidence level of a priority score may be performed based on confidence determination rules stored in database 910. ETL module 920 may be used to perform a variety of data warehousing processes including extraction of data from external sources, transforming data into a specified format and/or loading the data into a database such as knowledge base 905.

Risk prioritization system 900 may obtain data from a variety of external sources including application attributes database 925, risk assessment database 930, corporate directories such as directory 935, trends and forecasts database 940. Additionally or alternatively, system 900 may include interface 945 that allows system 900 to interface with users and/or a wide area network such as the World Wide Web (WWW) as well as a risk item capture module 950 that may be configured to capture risk items from users or applications.

The modules and components described with respect to FIG. 9 may include hardware, software, firmware or a combination thereof.

Additionally, the methods and features recited herein may further be implemented through any number of computer readable media that are able to store computer readable instructions. Examples of computer readable media that may be used include RAM, ROM, EEPROM, flash memory or other memory technology, CD-ROM, DVD or other optical disk storage, magnetic cassettes, magnetic tape, magnetic storage and the like.

While illustrative systems and methods as described herein embodying various aspects are shown, it will be understood by those skilled in the art that the invention is not limited to these embodiments. Modifications may be made by those skilled in the art, particularly in light of the foregoing teachings. For example, each of the elements of the aforementioned embodiments may be utilized alone or in combination or subcombination with elements of the other embodiments. It will also be appreciated and understood that modifications may be made without departing from the true spirit and scope of the present invention. The description is thus to be regarded as illustrative instead of restrictive on the present invention.

We claim:

1. A method for financial risk prioritization comprising:
   receiving, by a risk prioritization system having at least one processor, a risk item;
   determining whether the risk item can be automatically categorized based on a risk item classification scheme, the risk item classification scheme being predefined based on risk item characteristics including at least one of a source of a risk and a potential effect of the risk;
      if the risk item can be automatically categorized based on the predefined risk item classification scheme, identifying, by the risk prioritization system, a risk type of the risk item, the risk type being identified based on one or more attributes of the risk item as compared to other risk items of the same risk type or of a different risk type; and
      if the risk item cannot be automatically categorized based on the predefined risk item classification scheme, requesting input of the risk type of the risk item and updating risk item categorization rules specified in the predefined risk item classification scheme based on risk type input received in response to the request;
   determining a likelihood score, the likelihood score corresponding to a likelihood one or more risk effects will occur as a result of the risk item based on processing of one or more other risk items of the risk type, wherein determining the likelihood score includes:
      determining a forecasted likelihood;
      determining a historical likelihood; and
      calculating the likelihood score using the forecasted likelihood and the historical likelihood;
   determining an exposure cost associated with the risk item, wherein the exposure cost corresponds to a magnitude of an injury sustained in response to the occurrence of at least one of the one or more risk effects;
   determining a risk priority of the risk item based on a combination of the exposure cost and the likelihood score; and
   after determining the risk priority of the risk item:
      receiving additional data for the one or more other risk items of the risk type; and
      determining a new risk priority for the risk item based on the additional data.

2. The method of claim 1, wherein the one or more risk effects are predefined and associated with the risk type.

3. The method of claim 2, wherein the one or more predefined risk effects is associated with one or more predefined risk impacts.

4. The method of claim 3, further comprising:
   determining a confidence level reflecting a confidence with which the risk priority was determined, wherein the confidence level is determined based on an effectiveness of rules and data used for the risk type of the risk item;
   determining whether the confidence level meets a threshold confidence level; and
   in response to determining that the confidence level does not meet the threshold confidence level, submitting the risk item and the risk priority to personnel for manual review.

5. The method of claim 1, wherein determining the exposure score includes determining an initial cost score associated with the risk item and wherein the method further comprises:
   determining a risk score based on the likelihood score and the exposure cost;
   determining whether the risk score is above a specified threshold; and
   in response to determining that the risk score meets the specified threshold, formulating a first recommendation for addressing the risk item prior to determining the risk priority; and
   in response to determining that the risk score does not meet the specified threshold, formulating a second recommendation after determining the risk priority.

6. The method of claim 1, wherein:
   the risk item corresponds to an occurrence of the risk type in an application; and
   identifying the risk type of the risk item includes categorizing the risk item based on a preexisting risk type in a knowledge base.

7. The method of claim 1, wherein determining the exposure cost includes:
   determining a potential cost associated with the risk item;
   determining a historical cost associated with the risk item based on historical cost data; and
   calculating the exposure cost using the potential cost and the historical cost.

8. The method of claim 7, wherein calculating the exposure cost includes multiplying the potential cost by a first factor and multiplying the historical cost by a second factor.

9. The method of claim 1, wherein determining a risk priority of the risk item includes:
   identifying one or more mitigation solutions for the risk item;
   identifying personnel capable of implementing the one or more solutions;
   updating the exposure cost to account for costs associated with the identified personnel;
   determining a raw risk priority score based on the updated exposure cost, the likelihood score and a solution remediation percentage corresponding to a decreased in a likelihood of the risk item occurring after implementing the one or more solutions; and
   determining a modified risk priority score based on the raw risk priority score and a modifier assigned to the risk type, wherein the assigned modifier is applied to raw risk priority scores for all risk items of the risk type.

10. The method of claim 1, further comprising re-evaluating the risk priority of the risk item at predefined intervals.

11. The method of claim 1,
wherein the additional data for the one or more other risk items of the risk type includes cost data that represents an actual cost to mitigate a second risk item of the one or more other risk items of the risk type, and
wherein determining the new risk priority for the risk item is further based on the cost data.

12. A non-transitory computer readable medium for financial risk prioritization storing computer readable instructions that, when executed, cause an apparatus to:
receive, by a risk prioritization system, a risk item;
determine whether the risk item can be automatically categorized based on a risk item classification scheme, the risk item classification scheme being predefined based on risk item characteristics including at least one of a source of a risk and a potential effect of the risk;
in response to determining that the risk item can be automatically categorized based on the predefined classification scheme, identify, by the risk prioritization system, a risk type of the risk item, the risk type being identified based on one or more attributes of the risk item as compared to other risk items having the same risk type or a different risk type; and
in response to determining that the risk item cannot be automatically categorized based on the predefined classification scheme, request input of the risk type of the risk item and update risk item categorization rules of the predefined classification scheme based on risk type input received in response to the request;
determine a likelihood score, the likelihood score corresponding to a likelihood one or more risk effects will occur as a result of the risk item based on processing of one or more other risk items of the risk type, wherein determining the likelihood score includes:
determining a forecasted likelihood;
determining a historical likelihood; and
calculating the likelihood score using the forecasted likelihood and the historical likelihood;
determine an exposure cost associated with the risk item, wherein the exposure cost corresponds to a magnitude of an injury sustained in response to the occurrence of at least one of the one or more risk effects;
determine a risk priority of the risk item based on a combination of the exposure cost and the likelihood score; and
after determining the risk priority of the risk item:
receive additional data for the one or more other risk items of the risk type; and
determine a new risk priority for the risk item based on the additional data.

13. The computer readable medium of claim 12, wherein the one or more risk effects are predefined.

14. The computer readable medium of claim 13, wherein the one or more predefined risk effects is associated with one or more predefined risk impacts.

15. A financial risk prioritization system comprising:
a processor;
memory operatively coupled to the processor and storing computer executable instructions that, when executed by the processor of the risk prioritization system, cause the risk prioritization system to:
receive a risk item;
determine whether the risk item can be automatically categorized based on a risk item classification scheme, the risk item classification scheme being predefined based on risk item characteristics including at least one of a source of a risk and a potential effect of the risk;
if the risk item can be automatically categorized based on the predefined risk item classification scheme, identify a risk type of the risk item, the risk type being identified based on one or more attributes of the risk item as compared to other risk items of the same risk type or of a different risk type; and
if the risk item cannot be automatically categorized based on the predefined risk item classification scheme, request input of the risk type of the risk item and update risk item categorization rules specified in the predefined risk item classification scheme based on risk type input received in response to the request;
determine a likelihood score, the likelihood score corresponding to a likelihood one or more risk effects will occur as a result of the risk item based on processing of one or more other risk items of the risk type, wherein determining the likelihood score includes:
determining a forecasted likelihood;
determining a historical likelihood; and
calculating the likelihood score using the forecasted likelihood and the historical likelihood;
determine an exposure cost associated with the risk item, wherein the exposure cost corresponds to a magnitude of an injury sustained in response to the occurrence of at least one of the one or more risk effects;
determine a risk priority of the risk item based on a combination of the exposure cost and the likelihood score; and
after determining the risk priority of the risk item:
receive additional data for the one or more other risk items of the risk type; and
determine a new risk priority for the risk item based on the additional data.

16. The financial risk prioritization system of claim 15, wherein the one or more risk effects are predefined and associated with the risk type.

17. The financial risk prioritization system of claim 16, wherein the one or more predefined risk effects is associated with one or more predefined risk impacts.

18. The financial risk prioritization system of claim 17, wherein the memory stores additional computer executable instructions that, when executed by the processor of the risk prioritization system, further cause the risk prioritization system to:
determine a confidence level reflecting a confidence with which the risk priority was determined, wherein the confidence level is determined based on an effectiveness of rules and data used for the risk type of the risk item;
determine whether the confidence level meets a threshold confidence level; and
in response to determining that the confidence level does not meet the threshold confidence level, submit the risk item and the risk priority to personnel for manual review.

19. The financial risk prioritization system of claim 15, wherein determining the exposure score includes determining an initial cost score associated with the risk item, and wherein the memory stores additional computer executable instructions that, when executed by the processor of the risk prioritization system, further cause the risk prioritization system to:
determine a risk score based on the likelihood score and the exposure cost;

determine whether the risk score is above a specified threshold; and in response to determining that the risk score meets the specified threshold, formulate a first recommendation for addressing the risk item prior to determining the risk priority; and in response to determining that the risk score does not meet the specified threshold, formulate a second recommendation after determining the risk priority.

20. The financial risk prioritization system of claim 15, wherein:

the risk item corresponds to an occurrence of the risk type in an application; and identifying the risk type of the risk item includes categorizing the risk item based on a preexisting risk type in a knowledge base.

21. The financial risk prioritization system of claim 15, wherein determining the exposure cost includes:

determining a potential cost associated with the risk item;

determining a historical cost associated with the risk item based on historical cost data; and calculating the exposure cost using the potential cost and the historical cost.

22. The financial risk prioritization system of claim 21, wherein calculating the exposure cost includes multiplying the potential cost by a first factor and multiplying the historical cost by a second factor.

23. The financial risk prioritization system of claim 15, wherein determining a risk priority of the risk item includes:

identifying one or more mitigation solutions for the risk item;

identifying personnel capable of implementing the one or more solutions;

updating the exposure cost to account for costs associated with the identified personnel;

determining a raw risk priority score based on the updated exposure cost, the likelihood score and a solution remediation percentage corresponding to a decreased in a likelihood of the risk item occurring after implementing the one or more solutions; and determining a modified risk priority score based on the raw risk priority score and a modifier assigned to the risk type, wherein the assigned modifier is applied to raw risk priority scores for all risk items of the risk type.

24. The financial risk prioritization system of claim 15, wherein the memory stores additional computer executable instructions that, when executed by the processor of the risk prioritization system, further cause the risk prioritization system to re-evaluate the risk priority of the risk item at predefined intervals.

25. The financial risk prioritization system of claim 15, wherein the additional data for the one or more other risk items of the risk type includes cost data that represents an actual cost to mitigate a second risk item of the one or more other risk items of the risk type, and wherein determining the new risk priority for the risk item is further based on the cost data.

* * * * *